US006192832B1

(12) United States Patent
Husnik

(10) Patent No.: US 6,192,832 B1
(45) Date of Patent: Feb. 27, 2001

(54) FULLY ROTATABLE SQUIRREL PROOF BIRD FEEDER

(76) Inventor: Monte Joseph Husnik, 2304 Gordon Ave., St. Paul, MN (US) 55108

( * ) Notice: Subject to any disclaimer, the term of this patent is extended or adjusted under 35 U.S.C. 154(b) by 0 days.

(21) Appl. No.: 09/294,754

(22) Filed: Apr. 19, 1999

Related U.S. Application Data

(60) Provisional application No. 60/082,505, filed on Apr. 21, 1998.

(51) Int. Cl.[7] .................................................. A01K 39/01
(52) U.S. Cl. ................................... 119/57.9; 119/52.3
(58) Field of Search ............................. 119/57.9, 52.2, 119/52.3, 57.8, 51.01

(56) References Cited

U.S. PATENT DOCUMENTS

| 3,126,870 | * | 3/1964 | Matthew | 119/57.9 |
|---|---|---|---|---|
| 4,323,035 | | 4/1982 | Piltch . | |
| 5,165,364 | | 11/1992 | Horkey . | |
| 5,269,259 | * | 12/1993 | Keeler | 119/72 |
| 5,676,089 | | 10/1997 | Morganson . | |
| 5,947,054 | * | 9/1999 | Liethen | 119/57.9 |
| 6,050,221 | * | 4/2000 | Eaton et al. | 119/57.9 |

* cited by examiner

Primary Examiner—Peter M. Poon
Assistant Examiner—Yvonne R. Abbott

(57) ABSTRACT

A fully rotatable squirrel proof bird feeder for dislodging and preventing unwanted animals comprising a horizontal shaft with rotatable end sleeves, a seed receptacle with feed portals disposed midpoint and fixed to the shaft, and a counter-weighted shell comprising a window opening, weather awning, and rotatable perch assembly. The shell is mounted fully rotatable on the shaft closely surrounding the seed receptacle. Vertical braces fixed to the shaft ends prevent axial rotation of the seed receptacle and provide a secure method for hanging. An adjustable counter-weight fixed to the shell permits weight discrimination and biases alignment between the window opening and the feed portals. In the open feeding position, birds of preferential weight land on the perch and pass through the window opening to the feed portals. In the closed rotating position(s), heavier unwanted animals upon the feeder will roll the shell, the shaft sleeves, or the perch clockwise or counterclockwise and either be dislodged or the shell will close off access to the feed portals. An alternate embodiment integrates various features and counterbalance properties by molding the shell body shape and changing the pivot location of the shell.

35 Claims, 8 Drawing Sheets

FULLY ROTATABLE SQUIRREL PROOF BIRD FEEDER

BACKGROUND AND CROSS REFERENCES TO RELATED APPLICATIONS

This application uses communication of my prior Provisional Patent Application, Serial No. 60/082,505, filed, Apr. 21$^{st}$ 1998.

BACKGROUND OF THE INVENTION

The present invention relates to bird feeders, specifically to bird feeders designed to prevent squirrels and other unwanted animals from pilfering birdseed from the feeder.

Interest in feeding birds has grown rapidly in last decade from a relatively small number of hobbyists to the mainstream population. In addition, the baby boomer population is increasingly moving into retirement age, finding more free time to enjoy their yards and nearby bird wildlife. Feeding birds is also a valuable educational experience for children by teaching them about the environment around their homes and by nurturing basic respect for the animal world.

Bird feeders typically attract a wide variety of desirable birds. In spite of this fact, bird feeders also attract highly undesirable birds and nuisance animals. Undesirable birds pilfer large amounts of birdseed, take over feeding stations keeping smaller birds away, leave large amounts of bird droppings, flock upon yards, and take over nesting sites. In addition, animals such as gray and red squirrels, chipmunks, and raccoons pilfer large amounts of birdseed, destroy bird feeders, take over nesting sites, and possibly cause undo havoc upon property dwellings. A once enjoyable bird watching experience can quickly become a frustrating circus-like environment. It is not uncommon to see many undesirable birds flock in yards and squirrels and other pesky animals scramble about for the birdseed.

To combat nuisance problems associated with feeding birds, many products on the market incorporate deterrent features. The feeders typically include a guard, closing mechanism, or other deterrent features designed to accommodate desirable birds while preventing unwanted animals. One product sited in U.S. Pat. No. 5,676,089 by Morganson uses a rotatable cover to close access to the feed tray and additional dislodge the animal. Although the design may be useful in some cases, it incorporates stops which limit the full potential of dislodging the animal. Another example illustrated by Riggi U.S. Pat. No. 4,649,865, closes a roof section upon the feeder tray which prevents access. This solution allows the squirrel or other pest to climb about the feeder and develop alternate means to access the feed. An electrical shock mechanism is used by inventor Collins U.S. Pat. No. 5,471,951. Any heavy animal is electrically shocked while trying to access the seed. This deterrent method might be considered unnecessary and also suggests a need for an electrical wiring solution.

While these and many other products currently on the market promote squirrel deterrent features, they also suffer from a number of disadvantages:

(A) Feeders with tilt mechanisms or partial rotational features are functionally limited in their ability to dislodge unwanted animals. The limited range of movement or rotation angle allows the animal to cling on or climb on top of the feeder causing undo disruption, damage, or alternate means to access the bird seed.

(B) Many squirrel proof feeders are designed using only one deterrent feature such as a counterweight lever, an unsteady perch, a pivoting body section, a sliding guard, etc. Although some methods are effective upon direct contact against the feature, the overall deterrent qualities of the feeder is limited to an isolated location. An animal is therefore free to climb about the feeder and discover alternate means to access the seed.

(C) Other feeders provide some protection against unwanted animals yet they fall short of eliminating larger birds that consume large amounts of birdseed, often preventing more desirable birds from feeding.

(D) Other feeders limit access by intimidating screens. The screens usually prevent unwanted animals, but also discourage desirable birds that are slightly too big or suspicious by nature and unwilling to pass through the screen holes. These birds would otherwise benefit from an open feeding station.

(E) Many selective feeders are limited with respect to the location and method of attachment. The feeder often requires special means of attachment such as a post, and typically does not accommodate hanging from a tree limb, the most cost effective and desirable installation for consumers.

(F) Some feeders use an electrical shock mechanism to prevent animals from climbing or standing on the feeder. The shock type feeders require electrical wires, cords, or batteries that add one-time and ongoing cost and maintenance. It also imposes upon the consumer to create a power supply solution or the need to monitor the batteries useful charge life.

BRIEF SUMMARY OF THE INVENTION

Accordingly, several objects and advantages of the present invention are:

To provide a bird feeder that operates in a full range (360 degrees) of rotation maximizing the feeder's effectiveness in dislodging unwanted animals.

To provide a bird feeder that employs various deterrent features operating independently or mutually to resist, dislodge and discourage unwanted animal attempts.

To provide a bird feeder that is discriminatory based on the weight of animals and prevents unwanted larger birds from feeding. To provide a bird feeder that is open and accessible.

To provide a bird feeder that can be hung or mounted anywhere such as a tree, horizontal support member, or vertical support member.

To provide a bird feeder that is mechanically effective in preventing unwanted animals from feeding.

Additional advantages beneficial to the consumer include a rotatable bird feeder that does not require additional squirrel deterrent accessory devices such as guards, baffles, or special poles that add additional cost. A highly adjustable and easy to use feeder. A feeder that can be produced in a variety of materials and finishes, a feeder with integrated features such as a weather awning and integrated perch, a feeder that adds an element of entertainment. Yet other advantages will become evident in the following summary, description, and detailed drawings figures.

The rotatable squirrel proof bird feeder of the present invention embodies a horizontal shaft with rotatable sleeves suspended from vertical or horizontal brace(s). A seed receptacle with feed portals is disposed midpoint and fixed to the shaft. A counter-weighted shell includes a window opening, weather awning, and rotatable perch assembly. The shell is fully rotatable on the shaft closely surrounding the perimeter of the seed receptacle. The shell is capable of spinning freely about the shaft between an open feeding position and a closed rotating position. In the open feeding position, the window opening and perch assembly align with the feed portals. In the closed rotating position, the shell fully rotates (360 degrees) either in a clockwise or counter clockwise direction displacing the window opening by the shell, closing access to the feed portals.

In the open feeding position, A weight knob attached to the shell biases the alignment of the window opening and perch with the feed portals. Birds of preferred weight land on the perch and reach through the window opening to the feed portals.

In the closed rotating position, an unwanted animal can trigger several deterrent reactions. The shaft sleeves rotate and immediately challenge an animal approaching from the side. As the animal falters and tries to correct itself by grasping the shell, the shell spins about the shaft and challenges the animal. If the animal tries to grasp the perch assembly, the perch rotates which, at a minimum, rotates the shell and closes access to the feed portals. If the animal tries to reclaim a favorable position, the rotating features operate alone or jointly to prevent the animal from gaining a stable position on the feeder, and ultimately the animal is dislodged. During the animal attempt, the spinning disruption from shaft sleeves, the shell, and perch assembly is isolated from the fixed seed receptacle. After the animal attempt, the weight knob restores the feeder back to the open feeding position, biasing alignment between the window opening and the feed portals.

Figure 1:
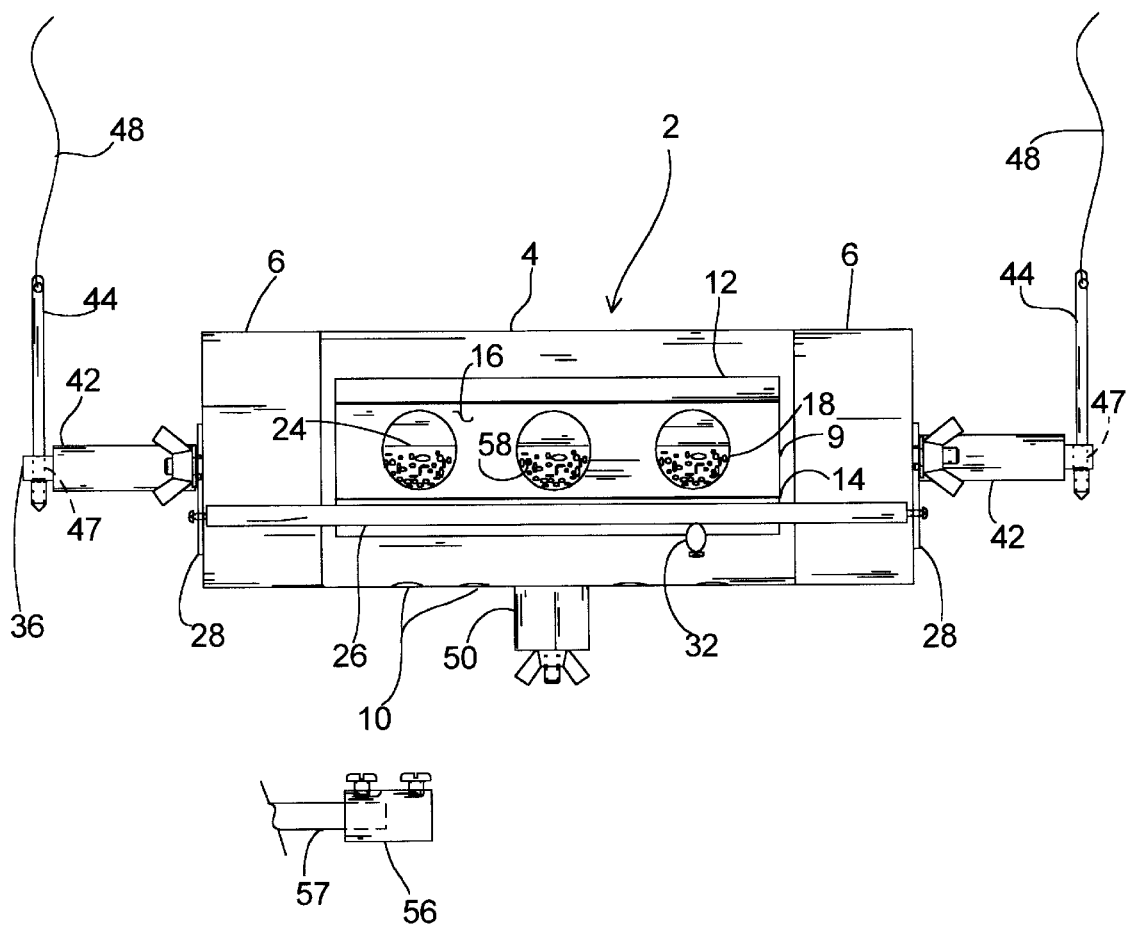
FIG. 1 shows a front elevation view of the feeder in a typical open feeding position.

| Reference Numerals in Drawings | |
|---|---|
| 2 | Feeder |
| 3 | Alternate Feeder |
| 4 | Shell |
| 5 | Lopsided Shell |
| 6 | Shell Caps |
| 7 | Slide |
| 8 | Slot |
| 9 | Window Opening |
| 10 | Drain Holes |
| 12 | Weather Awning |
| 14 | Lip |
| 16 | Seed Receptacle |
| 17 | Plug |
| 18 | Feed Portals |
| 20 | Seed Guide |
| 22 | Stabilizer Bolt |
| 23 | Curved Seed Guide |
| 24 | Seed Stop |
| 25 | Perforated Holes |
| 26 | Perch |
| 27 | Top Portal |
| 28 | Bracket |
| 29 | Bracket Hole |
| 30 | Perch Screw |
| 31 | Screw |
| 32 | Perch Weight |
| 33 | Pivot Bracket |
| 34 | Wing Nut |
| 35 | Shaft Slot |
| 36 | Shaft |
| 37 | Cap Slots |
| 38 | Flange Bolt |
| 39 | Weight Scale |
| 40 | Weight |
| 42 | Shaft Sleeve |
| 44 | Vertical Brace |
| 46 | Brace End |
| 48 | Wire |
| 49 | Center Hole |
| 50 | Weight Knob |
| 51 | Slot Bolt |
| 52 | Bracket Bolt |
| 54 | Flat Washer |
| 55 | Lock Washer |
| 56 | Horizontal Brace |
| 57 | Shaft Extension |
| 58 | Birdseed |
| 59 | Bird |
| 60 | Squirrel |

DETAILED DESCRIPTION OF THE INVENTION

The following drawing figures describe a fully rotatable squirrel proof bird feeder with various deterrent features for dislodging and preventing unwanted animals from feeding, and at the same time, accommodating desirable birds to feed from an open feeding station.

Referring to FIG. 1, a front elevation view shows a single sided version of a rolling bird feeder 2 in a typical feeding position. Feeder 2 consists of three primary components. A support assembly comprising a horizontal shaft 36 and vertical braces 44 which permit mounting and hanging. Seed receptacle 16 fixed to the shaft permitting storage of the birdseed, and shell 4 functions to accommodate desirable birds while freely revolving on the shaft to dislodge unwanted animals and discourage further attempts.

Corresponding e of vertical shaft braces 4 are fixed at the shaft ends through shaft holes 47. The shaft braces support feeder 2 separately or can be joined centrally above. Wires 48 fixed to shaft braces 44, provide means to hang feeder 2 in a preferred location. Horizontal shaft brace 56 and shaft extension 57 fix shaft 36 from the shaft end(s) providing an alternative way to hang or mount feeder 2.

Shaft 36 is typically 18" in length and ⅜" diameter and shaft braces 44 typically 6" in length by 3/16" diameter. The shaft and shaft braces are generally made from aluminum alloy providing a durable and lightweight support assembly. However, alternate materials can be used such as plastics, fiberglass, wood, and other metal alloys.

Seed receptacle 16 stores the birdseed and is fixed to shaft 36 inside shell 4. Feed portals 18 provide passage to access seed 58. Shell 4 comprises shell caps 6, window opening 9, weather awning 12, and lip 14. Shell 4 mounts fully rotatable on shaft 36 closely surrounding the perimeter of seed receptacle 16, and between shaft braces 44. Shaft sleeves 42, typically made of plastic, mount fully rotatable on shaft 36, between shaft braces 44 and shell 4. Shell 4 and shaft sleeves 42 prevent squirrel 60 (FIG. 6) and other unwanted animals from maintaining a stable position on feeder 2 and shaft 36.

Shell 4 is generally a cylindrical shape and measures approximately 12" in length×4" diameter. Seed receptacle 16 is also generally a cylinder and measures approximately 9" in length and 3½" diameter. However, both the shell and the seed receptacle can be made in different sizes and shapes including spherical, oval, tear drop or other shapes that mutually function together so that the shell fully rotates on the shaft and around the perimeter of the seed receptacle.

The shell and seed receptacle are principally fabricated from readily available and inexpensive PVC plastic. Alternative materials and methods of construction can be applied including: injection molded plastics, sheet metal fabrication (including metals such as copper, stainless steel, meshing etc.), extrusion techniques, castings techniques, etc. Injection molded plastics and sheet metal fabrication are preferred methods of construction in a production environment. These two methods will permit easy integration of various sub-component pieces into a single component (sub-components described further in FIG. 2).

Perch 26 attaches to shell caps 6 adjacent to window opening 9. Weight knob 50, mounts approximately center on shell 4, and biases the alignment between window opening 9 and feed portals 18. The perch is most often made of ½" wood dowel and attached by oval shaped Plexiglas brackets 28.

Figure 2:
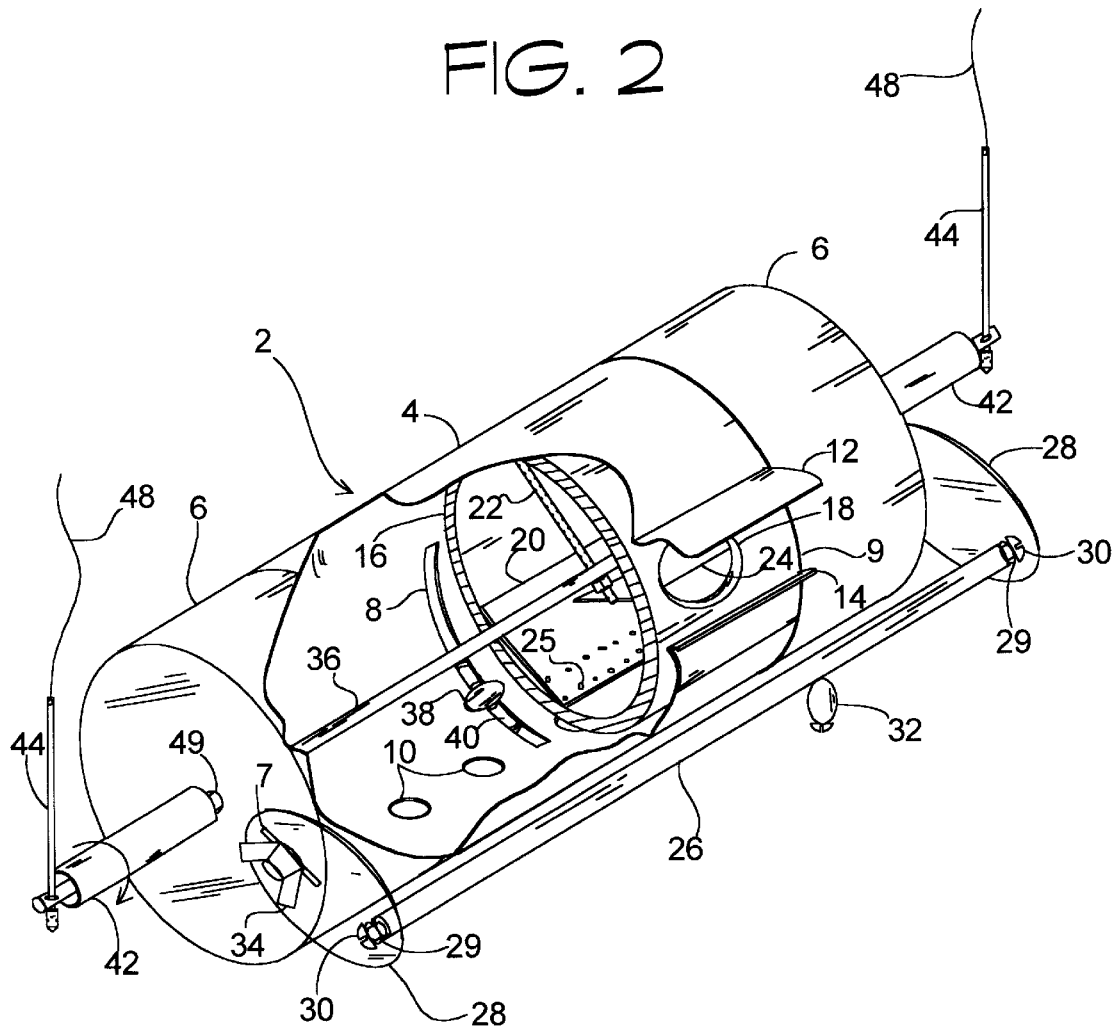
FIG. 2 shows an isometric view of the feeder, a cutout through the shell and, a section of the seed receptacle and related internal components.

Referring to FIG. 2, an isometric view of feeder 2 shows a partial cut-away of shell 4 and section of seed receptacle 16. Seed receptacle 16 is fixed to shaft 36 with feed portals 18 positioned laterally. The feed portals are approximately 1½" diameter spaced every 2 inches. Seed guide 20 is generally a 2½" metal plate, angled and fixed along the inside bottom of seed receptacle 16 directing the flow of birdseed. Perforated holes 25, cut 1/32" diameter along the bottom of seed receptacle 16, permit air circulation and water drainage. Seed stop 24 generally consists of extruded aluminum angle and is fixed along the top edge of feed portals 18 (FIG. 1), preventing spillage of seed 58 (FIG. 1). Slot 8 permits slide adjustment of weight knob 50 (FIG. 1) and typically measures ¼" wide by 3". The slot is most often centered on shell 4 beginning near the bottom and cut vertically along the backside. Drain holes 10 are cut about ½" diameter, spaced approximately every 2 inches near the bottom of shell 4, and permit removal of water and waste seed parts. Shell caps 6 cover the ends of shell 4 and permit mounting through center holes 49 on shaft 36.

Weather awning 12, located on the side of shell 4, prevents rain or snow from entering seed receptacle 16. The weather awning is generally molded from shell 4 and measures approximately 1½"×8". The shell is cut on three sides and bent along the uncut side upward approximately 30–45 degrees. Window opening 9 (FIGS. 1&2) is the remaining opening from fabrication of the weather awning and permits passage from perch 26 or lip 14, through shell 4, to feed portals 18. Lip 14, protrudes outward about 30–45 degrees near the bottom of window opening 9, measures approximately ½×8" or more, and is most often fabricated from the shell in the same manner as weather awning 12. The lip provides alternate means for small birds to perch. Even though the weather awning and the lip are often molded from the shell, where advantages in design and engineering can be gained, different material such as plastics, metals or wood can be substituted to add variety, strength, and durability.

Perch 26 is a landing site for birds and mounted rotatable on the ends of brackets 28, through bracket holes 29. Opposite ends of brackets 28 attach adjustably to shell caps 6, through slide 7. Brackets 28 attach the perch to the shell permitting up, down, in and out perch adjustments. The brackets also function as a guard and an additional deterrent by triggering shell 4 to rotate if an animal attempts to hold on or reach over from the side. Perch weight 32 is generally around 15–20 grams and fixed to perch 26 providing minimal counterbalance properties to the perch. Perch screws 30 turn in or out to adjust the rotational tension of the perch rotating on bracket holes 29. The perch screws permit fine adjustments to be made for preventing larger birds from feeding.

Figure 3:
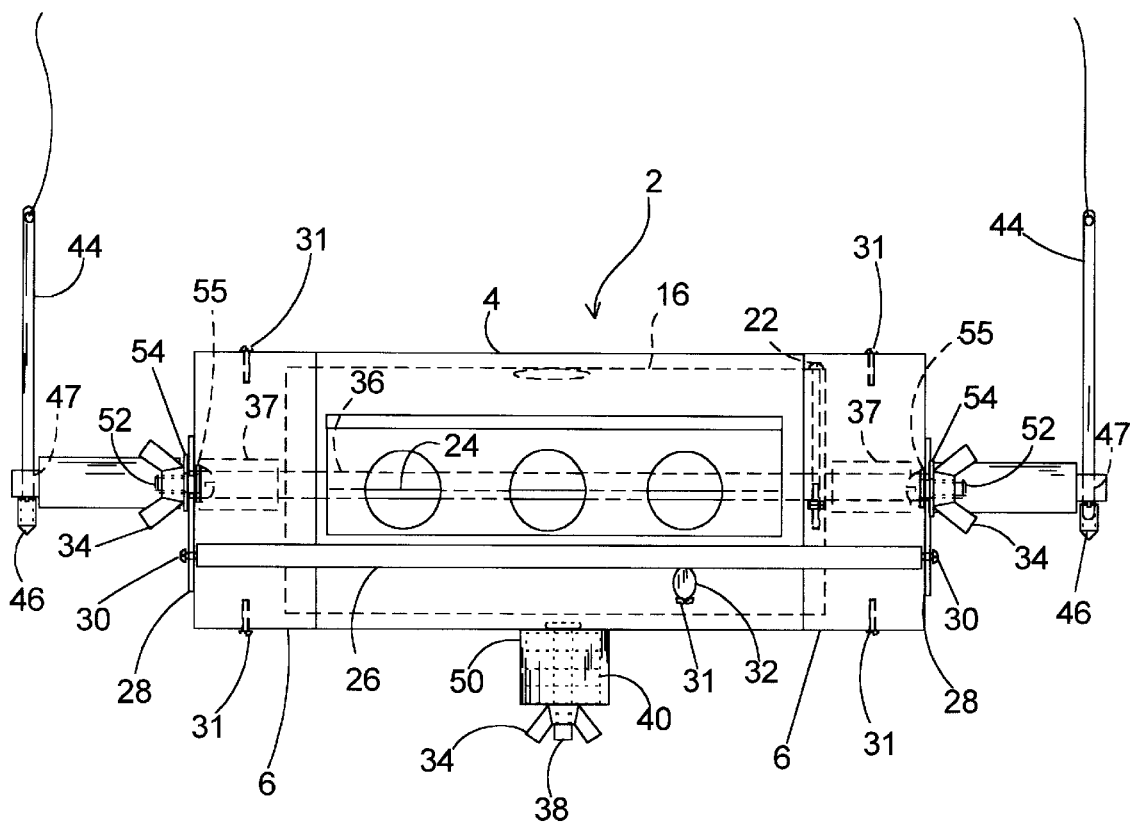
FIG. 3 shows a front elevation view detailing the fasteners and operating hardware.
Figure 4:
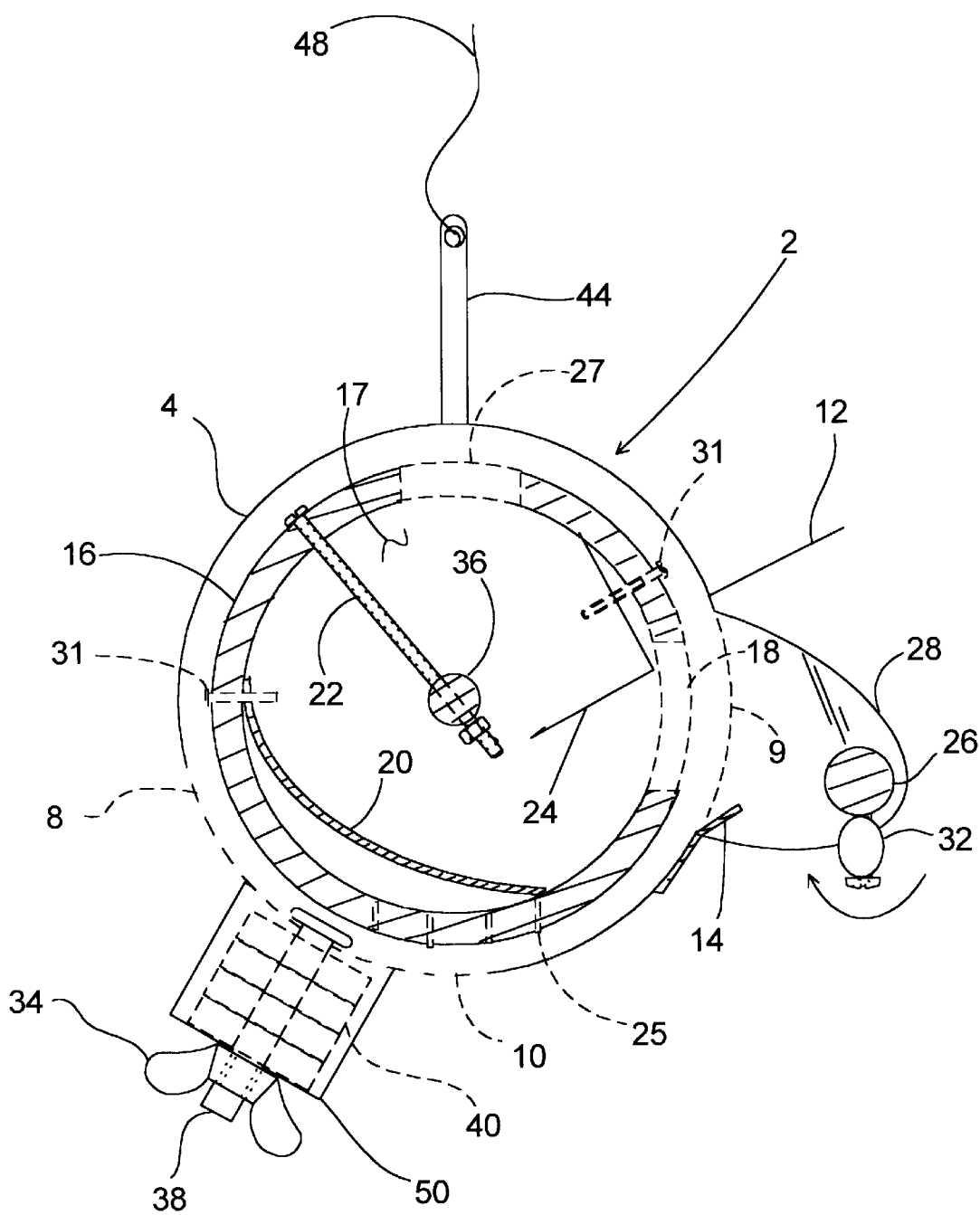
FIG. 4 shows a left side section view of the rotational relationship between the shell, seed receptacle, shaft, and attached perch.

Referring to FIG. 3, a front elevation of feeder 2 shows details of fastening and sub component hardware. Vertical shaft braces 44 are held in place by brace ends 46. Stabilizer bolt 22 (FIG. 3& 4) fixes seed receptacle 16 to shaft 36. Screws 31 fasten seed stop 24 and seed guide 20 to seed receptacle 16 (FIG. 4). Screws 31 fasten shell caps 6 to shell 4 and perch weight 32 to perch 26. Bolts 52, lock washers 55, flat washers 54, and wing nuts 34 secure brackets 28 to shell caps 6 permitting adjustment of brackets 28. Screws 30 mount ends of perch 26 rotatable on bracket 28, through holes 29 (FIG. 2). Flange bolt 38 and wing nut 34 fix weight knob 50 and weights 40 adjustably along slot 8 (FIG. 4) to shell 4. Spacers 37 mount on shaft 36 between seed receptacle 16 and shell 4 to retain lateral movement of the shell.

Directing attention to FIG. 4, a left side section view showing the spatial and functional association between various components. Top portal 27 provides means to fill feeder 2. Seed receptacle 16 typically surrounds shaft 36 equally and shell 4 typically surrounds seed receptacle 16 equally. Plugs 17 permit center mounting of seed receptacle 16 on shaft 36. A space of approximately ¼"–½" or greater is maintained between shell 4 and seed receptacle 16. During an unwanted animal attempt (FIG. 6), shell 4 displaces the position of window opening 9 by pivotally revolving on shaft 36. The close tolerance between shell 4 and seed receptacle 16 prevents a squirrel from lodging itself in an advantageous position which prohibits access to the feed portals. Weights 40, comprised usually of a metal alloy, can be added or removed to increase or decrease rotational tension of shell 4 about shaft 36. Weight knob 50 houses weights 40 and slides along slot 8, by way of flange bolt 38. When proper alignment between window opening 9 and feed portals 18 is complete, weight knob 50 is secured to shell 4 by wing nut 34. When weights 40 are added or removed, adjustment of weight knob 50 is required. Increasing weights 40 require weight knob 50 to be secured lower on shell 4, along slot 8, for proper alignment and conversely decreasing weights 40 require weight knob 50 be secured higher on shell 4, along slot 8, for proper alignment.

Figure 5:
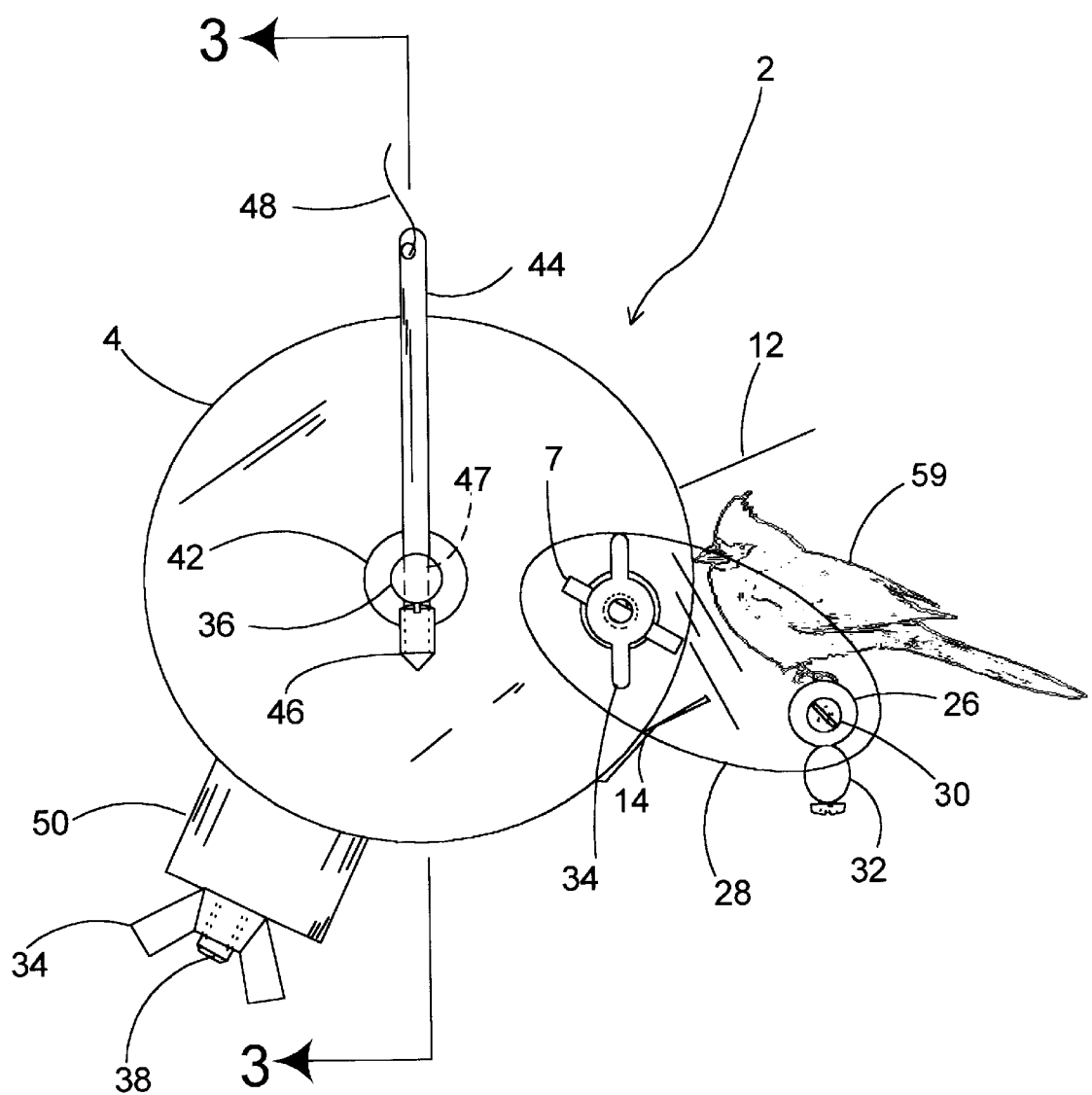
FIG. 5 shows a left side elevation view of the feeder in an open feeding position with a bird perched.

FIG. 5 shows a left side view of feeder 2 in a typical open feeding position with bird 59 resting on perch 26. Weight knob 50 is sufficient to maintain bird 59, and perch 26, in a steady position preventing rotation of shell 4 about shaft 36. Weight 32 is sufficient to maintain bird 59 in a steady position preventing rotation of perch 26 on screws 30 (FIG. 2). If a larger bird such as a Starling lands on the perch it will rotate along with the shell rotation and dislodge the bird. Once bird 59 has landed on perch 26, it is able to reach through window opening 9 and feed portals 18 to access birdseed 58 (FIG. 1).

Figure 6:
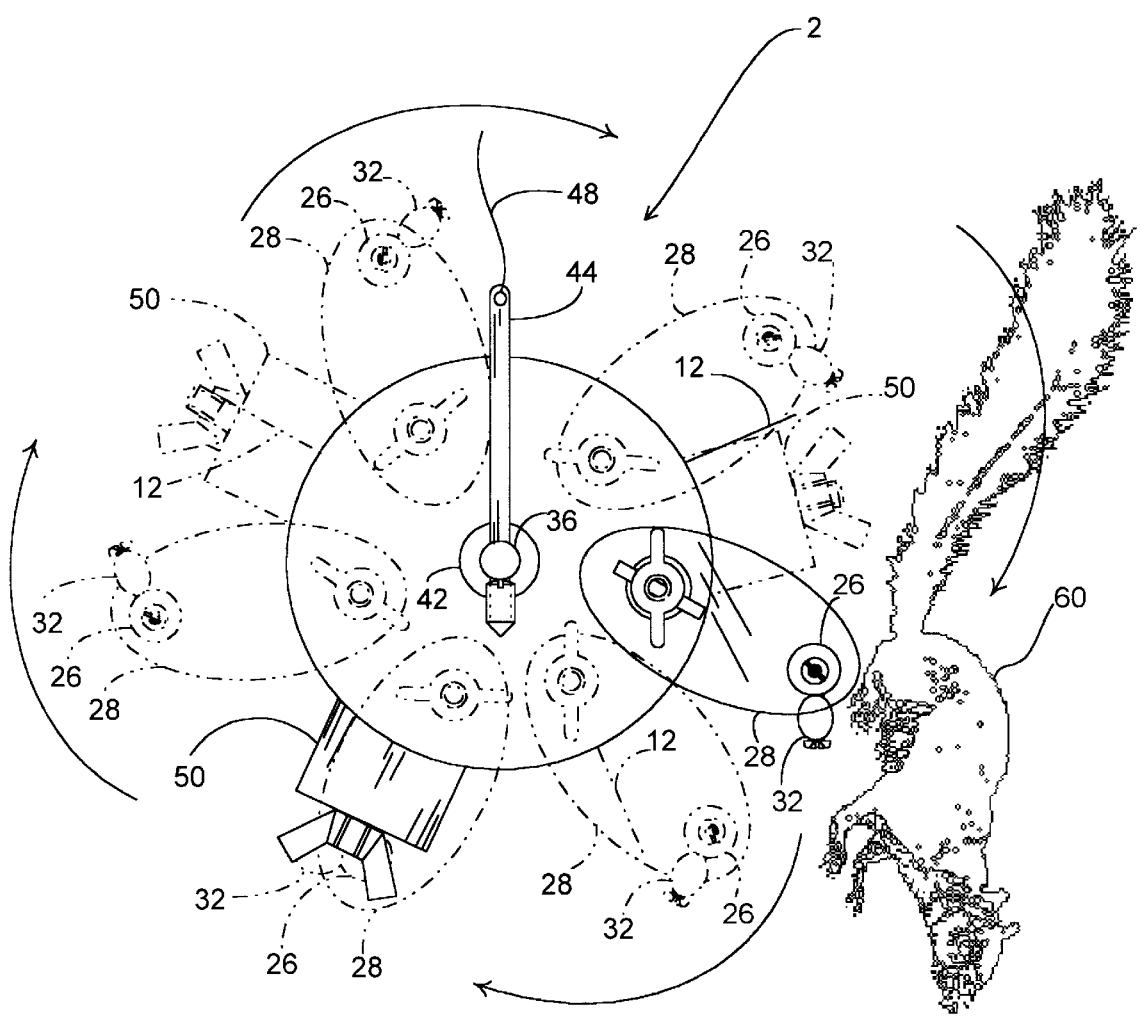
FIG. 6 shows a left side elevation of the feeder spinning during a typical squirrel attempt.

FIG. 6 shows a side view of a typical unwanted attempt by squirrel 60 upon feeder 2. The squirrel spins shell 4, Weight knob 50, and perch 26 in clockwise rotation. Squirrel 60 will commonly climb or jump on either the shaft sleeve 42, shell 4 (as illustrated), or perch 26 promoting rotation from one or more deterrent features of feeder 2. The weight of squirrel 60 on the clockwise side of shell 4 is sufficient enough to overcome the restoring counterweight force of weight knob 50, fully spinning shell 4 clockwise about shaft 36. If squirrel 60 climbs or jumps on the counterclockwise side of shell 4, squirrel 60 overcomes weight knob 50 and fully spins shell 4 counterclockwise about shaft 36. If squirrel 60 grasps perch 26, it will rotate making it extremely difficult to hold on. If the squirrel is able to keep holding onto perch 26, window opening 9 is displaced by shell 4 closing access to feed portals 18 (FIG. 4). After the unwanted animal attempt, weight knob 50 and weights 40 restores shell 4 back to the open feeding position.

From the detailed description above, a number of advantages of this fully rotatable rolling squirrel proof bird feeder become evident:

The feeder operates in a full range (360 degrees) of rotation in a clockwise and counterclockwise direction maximizing the feeder's effectiveness in dislodging and preventing unwanted animals.

The feeder employs various deterrent features which operate independently or mutually to resist, dislodge and discourage unwanted animal attempts.

The feeder is highly adjustable and discriminatory based on the weight of both squirrels and larger unwanted birds.

The feeder can be made in different sizes, shapes, and finishes and different materials may be used.

The feeder is open and accessible.

The feeder can hang or mount anywhere such as a tree, horizontal support member, or vertical support member.

The feeder is mechanically effective in preventing unwanted animals from feeding and does not require ongoing monitoring or costs to maintain the feeder.

Operation Of The Invention

FIGS. 1–6

The method of using the fully rotatable bird feeder is similar to other feeders that require hanging or mounting with the addition of some minor adjustments. First, feeder 2 is hung or mounted level by wires 48 or shaft extension 57 from a horizontal or vertical structure such as a tree limb, beam, or column. Wires 48 wrap around a support member independently (not shown) and are twisted together. Horizontal shaft brace 56 and shaft extension 57 usually mount from a vertical structure. Second, weight knob 50 is adjusted by loosening wing nut 34 and moving the knob along slot 8. When window opening 9 is aligned with feed portals 18, shell 4 is properly adjusted. Wing nut 34 is then tightened on flange bolt 38 forcing weight knob 50 and weights 40 to tighten against shell 4. Adjustments to perch 26 are made by loosening wing nuts 34 from bolts 52, then moving perch 26 and bracket 28 along slide 7. When the desired alignment is made, wing nuts 34 are tightened back on bolts 52, forcing bracket 28 against shell caps 6. The tension of the perch rotation is adjusted by turning perch screws 30 in or out to the desired setting. Third, Feeder 2 is filled with birdseed by rotating shell 4 so that window opening 9 aligns with top portal 27. A funnel is inserted in top portal 27 and birdseed poured into seed receptacle 16. When seed receptacle 16 is full, the feeder is lightly rocked from side to side spreading the seed out. The funnel is removed and shell 4 is restored to the open feeding position by weight knob 50. The feeder is now ready for viewing.

If at a later time, more or less rotational tension of shell 4 upon shaft 36 is desired, wing nut 34 and weight knob 50 is removed from flange bolt 38. Weights 40 are added or removed based on user's preference. Weight knob 50 is inserted back on flange bolt 38, adjusted along slot 8, and wing nut 34 is tightened.

Description and Operation—Alternate Embodiment

Figure 7:
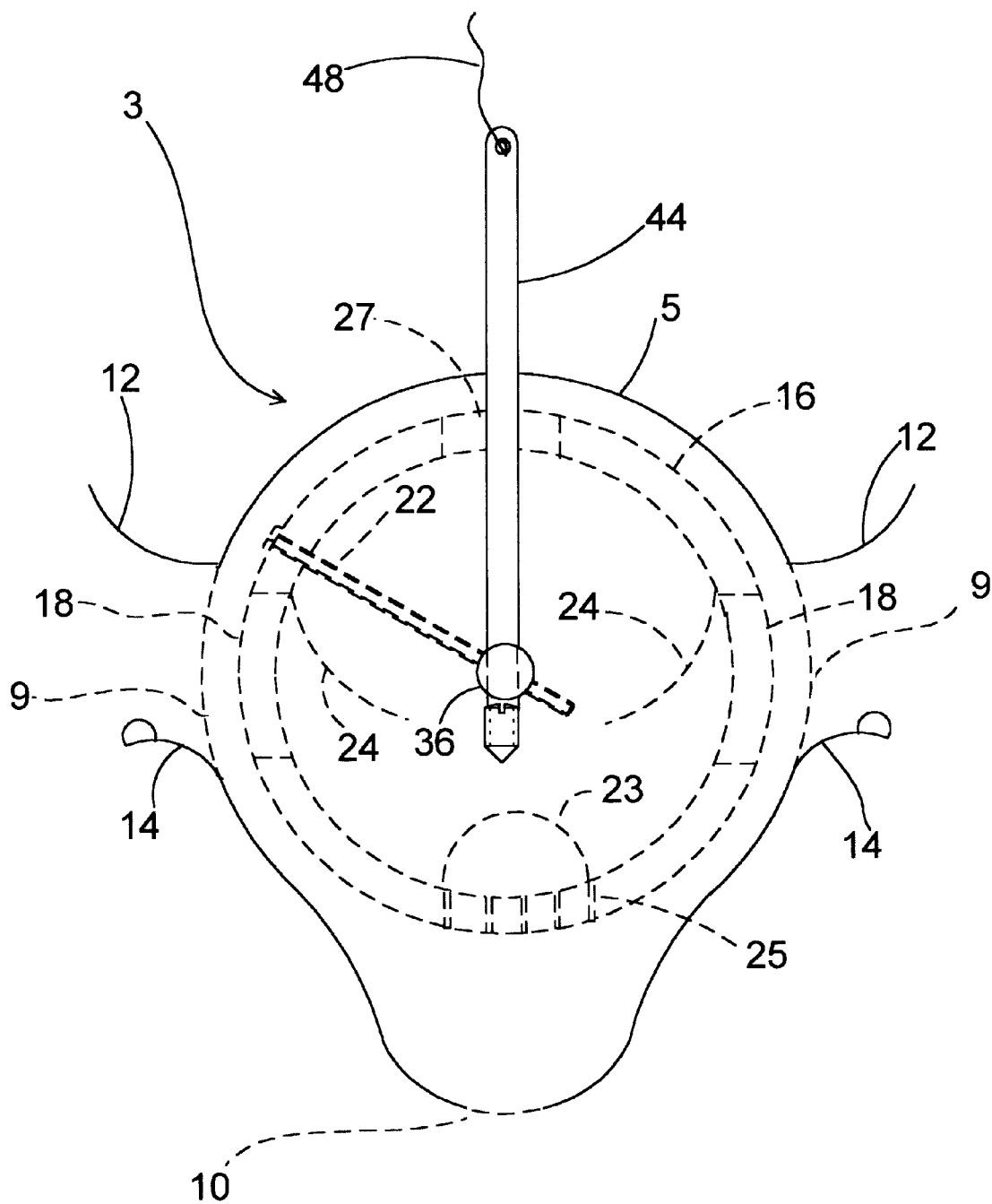
FIG. 7 shows a left side view of an alternate embodiment with lopsided shell, lip perches, and feeding portals on both sides of feeder.

FIG. 7 shows a left end view of an alternate embodiment with feed portals on both sides and a lopsided shell 5. As in feeder 2, shaft 36 supports hanging or mounting of feeder 3 by vertical or horizontal shaft braces 44 & 56, respectively. Seed receptacle 16 stores birdseed and is fixed near midpoint on shaft 36 by stabilizer bolt 22. Top portal 27 provides an opening for filling. Lopsided Shell 5 is fully rotatable on shaft 36 and mounted closely surrounding the perimeter of seed receptacle 16, between the shaft ends. Lopsided shell 5 biases alignment between window opening 9 and feed portals 18 by having greater than fifty percent of the shells total weight offset from the shafts center axis. Feed portals 18, window opening 9, and lip 14 are mirrored and biased into position from the offset counter-weight of lopsided shell 5. Lip 14 provides means for small birds such as chickadees to land and feed on either side of feeder 3. Shell 5 pivots on shaft 36 along center holes 49 (FIG. 2). Curved seed guide 23 is generally metal or molded plastic, shaped like a half circle, and positioned along the bottom of the seed receptacle directing the flow of birdseed. Seed stop 24 is generally molded plastic and prevents seed from spilling out of the feed portals. Perforated holes 25 permit air circulation and drain holes 10 allow water and seed waste parts to exit feeder 3. As in feeder 2, the lopsided shell 5 is capable of fully spinning about shaft 36 in a clockwise or counterclockwise direction between an open feeding position or closed rotating position.

In addition to the lopsided shape, shell 5 could be round but constructed of thicker material on one portion of the shell. The shell would consequently be mounted with greater than 50 percent of its body weight on one side and provide counterbalance properties upon shaft 36. Additionally, weights 40 can be added to increase the counterbalance properties of shell 5 and perch 26 added to provide an additional landing site. Feeder 3 can also be made into a single sided feeder.

Figure 8:
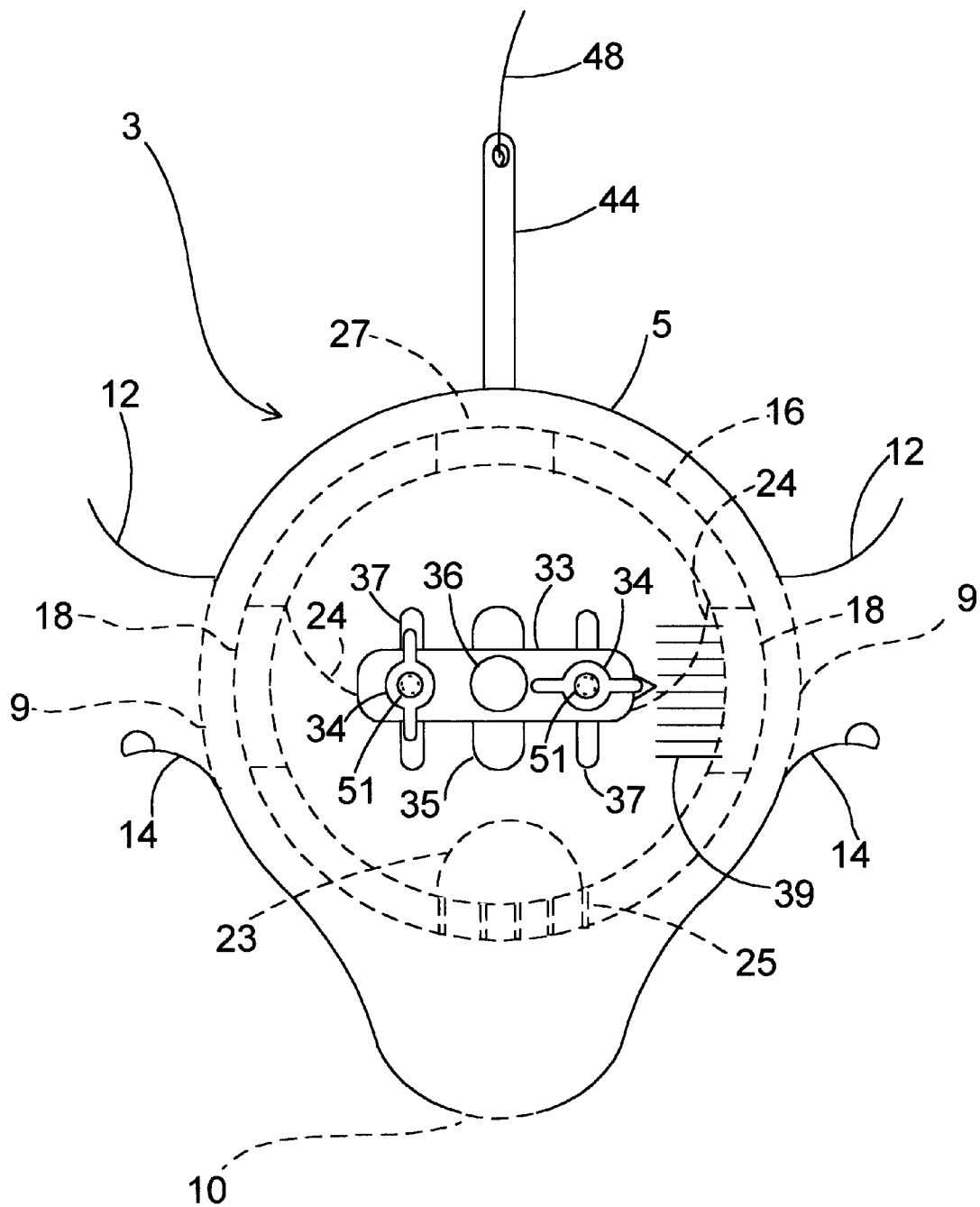
FIG. 8 Shows a left side view of the alternate embodiment with lopsided shell and adjustable pivot bracket.

FIG. 8 shows a left end view of the alternate embodiment with pivoting adjustment slots. Pivot bracket 33 slides over shaft 36 and mounts to lopsided shell 5 along shaft slot 35 and cap slots 37. Lopsided shell 5 is secured to pivot bracket 33, along cap slots 37, by way of slot bolts 51 and wing nut 34. Lopsided shell 5 is vertically adjustable along cap slots 37 and shaft slot 35 by using the point on pivot bracket 33 and aligning it with weight scale 39. Lopsided shell 5 is moved along shaft slot 35 and when the desired alignment of pivot bracket 33 with weight scale 39 is completed on both sides of shell 5 (opposite side not shown), wing nuts 34 are tightened firmly against pivot bracket 33 to shell 5. The adjustment of Shell 5 along slots 31 & 37 allows differing pivot points on shaft 36, therefore allowing greater or lesser rotational tension of shell 5 rotating about shaft 36.

In addition to using a lopsided shape, shell 5 could be made symmetrical and pivotally adjusted along the shaft slot and the cap slots. In this example, greater than 50 percent of the shell's weight is offset and pivoting about shaft 36. This provides similar counterbalance functionality as a lopsided shell. Also, optional weights 40 and perch 26 can be added to feeder 3.

Conclusion, Ramifications, And Scope Of Invention

Thus, the reader will see that the fully rotatable squirrel proof bird feeder of the present invention provides a mechanical device that is highly adjustable and durable. It prevents unwanted animals and larger birds from feeding while accommodating desirable birds. The feeder delivers a full range of clockwise or counterclockwise rotational operation producing the maximum results in dislodging unwanted animals. Additionally, the feeder is attractive and yields some entertainment value. It can also be mounted or hung from a variety of locations. Other advantages include that this is:

A bird feeder that provides a comprehensive solution for dislodging and preventing unwanted animals and larger birds.

A bird feeder that is open and accessible on one or more sides.

A bird feeder that can be mass produced at reasonable cost.

A bird feeder that is mechanically effective in dislodging and discouraging unwanted animals and does not require ongoing cost to operate.

A bird feeder incorporating numerous features such as counterbalance weight system, a rain and snow guard, and lip perch.

While the above description includes detailed specifications, it should not be interpreted as limiting the scope of the invention, but viewed only as preferred examples. Thus, many possibilities exist, for example:

(A) The feeder could be used as squirrel proof bird house such as a Wren house. This can be accomplished by reducing the size, using only one feed portal, and removing various sub-components such as: the rotatable perch assembly, and the internal components of the seed receptacle.

(B) The horizontal shaft could be fixed from the center or various sizes and shapes. The feeder would therefore be split in halves or two feeders mounted opposite of center. The shaft could be split in two small sections and mounted to the ends of the seed receptacle or the shaft bent and pivoting offset like bicycle pedals.

(C) Shaping the seed receptacle into a tray or cup or multiple sections would eliminate various sub-components. The seed receptacle could be removable for filling. Various unusual shapes could be applied to the shell and shaft sleeves such as a star shape, a globe, a house shape, or animal shape, etc. The shaft sleeve could be removed and the shaft braces closely fitted against the shell. The shell could be pivotally attached to the shaft by brackets and the shell body cover only the perimeter of the seed receptacle where the feed portals are located.

(D) The feeder could be produced as an assemblage of separate components that snap, buckle, or hinge together and/or from molded units. The rotating perch can be removed and alternate lip formed in various shapes such as a bulge, spout, a waterfall, an S curve, etc. The window opening could be adjustable along the perimeter of the shell to compensate for different counterbalance settings.

(E) The perch could be various shapes and attached by various means such as a perpendicular stem, a flat plate inserted in a groove, a casting of a tree branch on rotatable mounting brackets, etc. The perch could also be offset and pivot similar to the shell. A banana shape or other circular shape could be applied to the perch bracket. Various finishes can be applied such as birch bark. The weight knob could removed or in different configurations, for example, weighted curved plates formed onto the shell or an attached rod with removable tokens. The weight could be located internally or externally, in or out adjustable, or on the shaft attached to the shell.

Accordingly, the scope of the invention should not be determined by the embodiment(s) illustrated, but by the attached claims and their legal equivalents.

I claim:

1. A squirrel proof bird feeder for dislodging and preventing unwanted animals comprising:
   (a) a support assembly comprising at least one pivot shaft, and at least one shaft brace, the pivot shaft fixed by the shaft brace,
   (b) a seed receptacle fixed to the pivot shaft, the seed receptacle comprising at least one feed portal near its side, (c) a shell, the shell mounted rotatable on said pivot shaft, the shell comprising at least one window opening near its side, and a landing site adjacent to said window opening, the shell surrounding the perimeter of the seed receptacle such that the shell body width at least covers the outer boundary of the at least one feed portal, and the shell being rotatable between an open feeding position wherein the window opening is aligned with the at least one feed portal and a closed rotating position, wherein the position of the window opening is displaced by the shell, (d) a perch assembly, the perch assembly comprising at least one piece of rigid material, the rigid material being independently rotable and connecting with said shell and outwardly positioned near said window opening such that an animal of predetermined weight alighting said rigid material rotates said shell from an open feeding position to a closed rotating position, wherein, unwanted animals of predetermined weight which land upon the clockwise side of the shell cause circumrotation of the shell clockwise from the open feeding position to the closed rotating position, and when landing upon the counterclockwise side of the shell cause circumrotation of the shell counterclockwise from the open feeding position to the closed rotating position.

2. The feeder of claim 1 further including at least one counterweight connecting with said shell biasing the position of said window opening with the at least one feed portal.

3. The feeder of claim 2 wherein the position of said counterweight connecting with said shell is alterable.

4. The feeder of claim 1 wherein said rigid material is counterbalanced between a stable position and a rotating position.

5. The feeder of claim 1 wherein said rigid material is tension adjustable between a fixed position and a rotating position.

6. The feeder of claim 1 further including at least one sideward guard adjacent to said window opening.

7. The feeder of claim 1 further including at least one rotatable sleeve mounted on said pivot shaft, adjacent to said shell.

8. The feeder of claim 1 wherein said window opening is adjustable along the perimeter of said shell.

9. The feeder of claim 1 wherein the angle of rotation between said open feeding position and said closed rotating position in a clockwise and counterclockwise rotation is greater than 360 degrees.

10. The feeder of claim 1 wherein said shaft brace comprises a plurality of support members fixed to said pivot shaft and connectable to an external supporting structure.

11. A squirrel proof bird feeder for dislodging and preventing unwanted animals comprising:

(a) a support assembly comprising at least one pivot shaft, and at least one shaft brace, the pivot shaft fixed by the shaft brace, (b) a seed receptacle fixed to the pivot shaft, the seed receptacle comprising at least one feed portal near its side, (c) a shell, the shell mounted rotatable on said pivot shaft, the shell comprising at least one window opening near its side, and at least one landing site adjacent to said window opening, the shell having a body mass with at least one portion of said body mass molded such that said portion overcomes is heavier on one side overcoming the shells balance biasing said window opening into alignment with said feed portal, the shell surrounding the perimeter of the seed receptacle such that the shell body width at least covers the outer boundary of the at least one feed portal, the shell being rotatable between an open feeding position wherein the window opening is aligned with the at least one feed portal and a closed rotating position, wherein the position of the window opening is displaced by the shell, wherein, unwanted animals of predetermined weight which land upon the clockwise side of the shell cause circumrotation of the shell clockwise from the open feeding position to the closed rotating position, and when landing upon the counterclockwise side of the shell cause circumrotation of the shell counterclockwise from the open feeding position to the closed rotating position.

12. The feeder of claim 11 further including a lever perch assembly, the lever perch assembly comprising at least one piece of rigid material, the rigid material connecting with said shell and outwardly positioned near said window opening such that an animal of predetermined weight alighting said rigid material rotates said shell from an open feeding position to a closed rotating position.

13. The feeder of claim 12 wherein said rigid material is rotatable.

14. The feeder of claim 12 wherein said rigid material is counterbalanced between a stable position and a rotating position.

15. The feeder of claim 12 wherein said rigid material is tension adjustable between a fixed position and a rotating position.

16. The feeder of claim 11 further including at least one counterweight connecting with said shell further biasing the position of said window opening with the at least one feed portal.

17. The feeder of claim 16 wherein the position of said counterweight connecting with said shell is alterable.

18. The feeder of claim 11 further including at least one sideward guard adjacent to said window opening.

19. The feeder of claim 11 further including at least one rotatable sleeve mounted on said pivot shaft, adjacent to said shell.

20. The feeder of claim 11 wherein said window opening is adjustable along the perimeter of said shell.

21. The feeder of claim 11 wherein the angle of rotation between said open feeding position and said closed rotating position in a clockwise and counterclockwise rotation is greater than 360 degrees.

22. The feeder of claim 11 wherein said shell is adjustable on said pivot shaft between an offset position and a centered position.

23. The feeder of claim 11 wherein said shaft brace comprisies a plurality of support members fixed to said pivot shaft and connectable to an external supporting structure.

24. A squirrel proof bird feeder for dislodging and preventing unwanted animals comprising:

(a) a support assembly comprising at least one pivot shaft, and at least one shaft brace, the pivot shaft fixed by the shaft brace, (b) a seed receptacle fixed to the pivot shaft, the seed receptacle comprising at least one feed portal near its side, (c) a shell, the shell mounted rotatable on said pivot shaft, the shell comprising at least one window opening near its side, and at least one landing site adjacent to said window opening, the shell being adjustable between an offset and centered position on said pivot shaft such that it biases said window opening into alignment with said feed portal, the shell surrounding the perimeter of the seed receptacle such that the shell body width at least covers the outer boundary of the at least one feed portal, the shell being rotatable between an open feeding position wherein the window opening is aligned with the at least one feed portal and a closed rotating position, wherein the position of the window opening is displaced by the shell, wherein, unwanted animals of predetermined weight which land upon the clockwise side of the shell cause circumrotation of the shell clockwise from the open feeding position to the closed rotating position, and when landing upon the counterclockwise side of the shell cause circumrotation of the shell counterclockwise from the open feeding position to the closed rotating position.

25. The feeder of claim 24 further including a lever perch assembly, the lever perch assembly comprising at least one piece of rigid material, the rigid material connecting with said shell and outwardly positioned near said window opening such that an animal of predetermined weight alighting said rigid material rotates said shell from an open feeding position to a closed rotating position.

26. The feeder of claim 25 wherein said rigid material is rotatable.

27. The feeder of claim 25 wherein said rigid material is counterbalanced between a stable position and a rotating position.

28. The feeder of claim 25 wherein said rigid material is tension adjustable between a fixed position and a rotating position.

29. The feeder of claim 24 further including at least one counterweight connecting with said shell further biasing the position of said window opening with the at least one feed portal.

30. The feeder of claim 29 wherein the position of said counterweight connecting with said shell is alterable.

31. The feeder of claim 24 further including at least one sideward guard adjacent to said window opening.

32. The feeder of claim 24 further including at least one rotatable sleeve mounted on said pivot shaft, adjacent to said shell.

33. The feeder of claim 24 wherein said window opening is adjustable along the perimeter of said shell.

34. The feeder of claim 24 wherein the angle of rotation between said open feeding position and said closed rotating position in a clockwise and counterclockwise rotation is greater than 360 degrees.

35. The feeder of claim 24 wherein said shaft brace comprises a plurality of support members fixed to said pivot shaft and connectable to an external supporting structure.

* * * * *